(12) United States Patent
Martin et al.

(10) Patent No.: US 9,107,534 B2
(45) Date of Patent: Aug. 18, 2015

(54) COOKER

(71) Applicant: Junior Legends Sporting Cards Pty Ltd., Upper Coomera (AU)

(72) Inventors: Ryan Arthur Martin, Gilston (AU); Nathan Aaron Antonik, Upper Coomera (AU)

(73) Assignee: SPACE GRILL GLOBAL IP PTY LTD., Queensland (AU)

( * ) Notice: Subject to any disclaimer, the term of this patent is extended or adjusted under 35 U.S.C. 154(b) by 319 days.

(21) Appl. No.: 13/680,294

(22) Filed: Nov. 19, 2012

(65) Prior Publication Data

US 2013/0133527 A1    May 30, 2013

(30) Foreign Application Priority Data

Nov. 30, 2011 (AU) ................................. 2011101566

(51) Int. Cl.
*A47J 37/00* (2006.01)
*A47J 37/04* (2006.01)
*F24B 1/20* (2006.01)
*A47J 37/07* (2006.01)

(52) U.S. Cl.
CPC ............ *A47J 37/041* (2013.01); *A47J 37/0763* (2013.01); *A47J 2037/0777* (2013.01); *F24B 1/205* (2013.01)

(58) Field of Classification Search
CPC ..................... A47J 2037/0777; A47J 37/0763; F24B 1/205
USPC ........... 99/339, 340, 422, 423, 424, 425, 446, 99/449, 450; 126/9 R, 26
See application file for complete search history.

(56) References Cited

U.S. PATENT DOCUMENTS

| | | | | | |
|---|---|---|---|---|---|
| 3,182,585 | A | * | 5/1965 | Rensch et al. | 99/340 |
| 3,308,747 | A | * | 3/1967 | Spagnolo | 99/400 |
| 4,173,180 | A | * | 11/1979 | Reiland | 99/391 |
| 4,884,499 | A | * | 12/1989 | Rensch et al. | 99/449 |
| 4,924,844 | A | * | 5/1990 | Bransburg | 126/9 R |
| 6,192,788 | B1 | * | 2/2001 | Benedictus et al. | 99/340 |

* cited by examiner

*Primary Examiner* — Reginald L Alexander
(74) *Attorney, Agent, or Firm* — Kirton McConkie; Evan R. Witt

(57) ABSTRACT

A cooker is disclosed. The cooker includes a cooking assembly having a cooking member, a hinging arrangement to mount the cooking assembly onto a support so that the cooking assembly can be displaced relative to the support between an operative position in which the cooking member is in a substantially horizontal orientation, and a stowed or inoperative position in which the cooking assembly is displaced towards the support, and a front drip tray that is pivotally mounted on the cooking assembly and that is configured to pivot relative to the cooking assembly while the cooking assembly is pivoted between the operative and stowed positions and to catch cooking waste, such as drippings from the cooking member as the cooking assembly is pivoted into the stowed position.

13 Claims, 10 Drawing Sheets

COOKER

CROSS-REFERENCE TO RELATED APPLICATIONS

This application claims the benefit of Australian Patent Application No. 2011101566 filed on Nov. 30, 2011, which claims priority to Australian Provisional Patent Application No. 2010905273 filed on Nov. 30, 2010.

TECHNICAL FIELD OF THE INVENTION

This invention relates to a cooker.

BACKGROUND OF THE INVENTION

A conventional outdoor cooker, such as a gas or electric barbecue, requires a cooking plate that results in the cooker generating a relatively large footprint which takes up space inconveniently in living areas such as balconies and patios where space is at a premium.

Furthermore, outdoor cookers can be difficult to clean, particularly when there is a significant build-up of drippings and other charred material on the cooking plate or grill.

SUMMARY OF THE INVENTION

The invention provides a cooker, which comprises a cooking assembly having a cooking member; a hinging arrangement to mount the cooking assembly onto a support so that the cooking assembly can be displaced relative to the support between an operative position in which the cooking member is in a substantially horizontal orientation and a stowed or inoperative position in which the cooking assembly is displaced towards the support; and a front drip tray that is pivotally mounted on the cooking assembly and that is configured to pivot relative to the cooking assembly while the cooking assembly is pivoted between the operative and stowed positions and to catch cooking waste, such as drippings from the cooking member as the cooking assembly is pivoted into the stowed position.

"Drippings" includes liquid fats, oils and other debris that collect on the cooking member during cooking.

In this specification, including the claims, the word "rear", "back", and similar are to be understood as referring to a component or part that is at or near a support on which the cooker is mounted. The words "front" and similar are to be understood as referring to a component or part that is at or near a point furthest from the support, when the cooking assembly is in the operative position. The inventor(s) appreciates that the cooker will be provided without reference to the support. It follows that words such as "rear", "back", "front" and other words making reference to a component or structure external of the cooker not to be regarded as limiting the scope of the appended claims, in any way.

The cooking member may be a griddle or grill or combination of a griddle and a grill, either as a one-piece structure or as a collocation or assembly of two or more griddles or grills.

The cooking assembly may be configured to utilize one of gas and electricity as a source of energy.

The hinging arrangement may be configured to engage and support the cooking assembly, in a releasable manner, in the operative position and, upon manipulation of the cooking assembly, to permit the cooking assembly to pivot into the stowed position. It follows that the hinging arrangement can take a number of different forms. For example, the hinging arrangement can be that form of arrangement found in household items such as foldaway clotheslines which are initially lifted or pivoted upwardly from the operative position to disengage a catch mechanism and then pivoted downwardly into a folded and stowed condition. When such arrangements are pivoted back into the operative condition, the catch mechanism is engaged at that operative position or condition. It is thus to be understood that the inventor(s) envisaged that such a hinging arrangement could form part of the cooker defined above.

In one embodiment, the hinging arrangement may include a mounting plate fastenable to the support and two spaced hinge brackets for mounting on the support and associated hinge pins, or hinge rods, attached to the cooker assembly. Each hinge bracket may define a slot that extends generally orthogonally with respect to the mounting plate and a passage that extends from a front end of the slot and that opens at an upper edge of the hinge bracket. A hinge pin or rod may be receivable through the opening in the upper edge into the slots and to slide in the slot towards and away from the mounting plate. Each hinge bracket may also include a detent recess in front of the slots that opens at the upper edge of the hinge bracket, for cooperating with an associated detent pin or rod on the cooker assembly to support the cooker assembly in its operative position within the hinge rod is received in the slot and the detent rod is received in the detent recess.

The drip tray arrangement may include a bottom drip tray that extends across an operative bottom side of the cooking assembly opposite the cooking member, to catch drippings from the cooking member, while the cooking assembly is in operation.

The front drip tray and the bottom drip tray may be positioned relative to each other to permit movement of material, under gravity, from the bottom drip tray into the front drip tray, at least when the cooking assembly is in the stowed condition. For example, the bottom drip tray may enter the front drip tray.

The cooking member may include a front edge formation or lip that is positioned to direct cooking waste from the cooking member into the front drip tray past a face of the cooking assembly when the cooking assembly is displaced from its operative to its stowed position. This serves to avoid contaminating a front control panel of the cooking assembly with drippings.

The cooking assembly may define an interior space or internal volume, and may include a heat source arrangement within the interior space. The heat source arrangement may include a plurality of gas burners, liquid or solid fuel burners, electrical heating elements, or the like.

Further, the cooking member may be detachably mounted or mountable at the major side of the cooking assembly over the heat source arrangement.

The cooking assembly and cooking member may include a plurality of complementary locating or retaining formations to locate, secure or retain the cooking member in position, while the cooking assembly is displaced between the operative position and the stowed position.

The cooker may also include a lid. The lid may be configured for closing-off at least part of the cooking assembly when the cooking assembly is in its stowed position. The lid may also be configured for mounting onto the cooking assembly when the cooking assembly is in its operative position in a manner that forms a splash back for the cooker. The lid may be configured to close off an internal volume of the cooking assembly.

The cooking assembly may also include a handle to facilitate displacement of the cooking assembly between the operative and stowed positions. The handle may be located on a front edge of the cooking member. The handle may include a biasing member that urges the handle towards a position in which it stands up away from the cooking member. The handle may be configured so that, when the lid is in position, the handle is pushed towards the cooking member. Thus, when the lid is removed, the handle moves into an operative condition in which it can be grasped to facilitate manipulation of the cooking assembly.

A cooker, in accordance with the invention, may manifest itself in a variety of forms. It will be convenient hereinafter to describe an embodiment of the invention in detail with reference to the accompanying drawings. The purpose of providing this detailed description is to instruct persons having an interest in the subject matter of the invention how to carry the invention into practical effect. However it is to be clearly understood that the specific nature of this detailed description does not supersede the generality of the preceding broad description.

DETAILED DESCRIPTION OF THE INVENTION

In the drawings, reference numeral 10 generally indicates an embodiment of a cooker, in accordance with the invention. The cooker 10 is in the form of an outdoor barbecue.

Figures 1, 2:
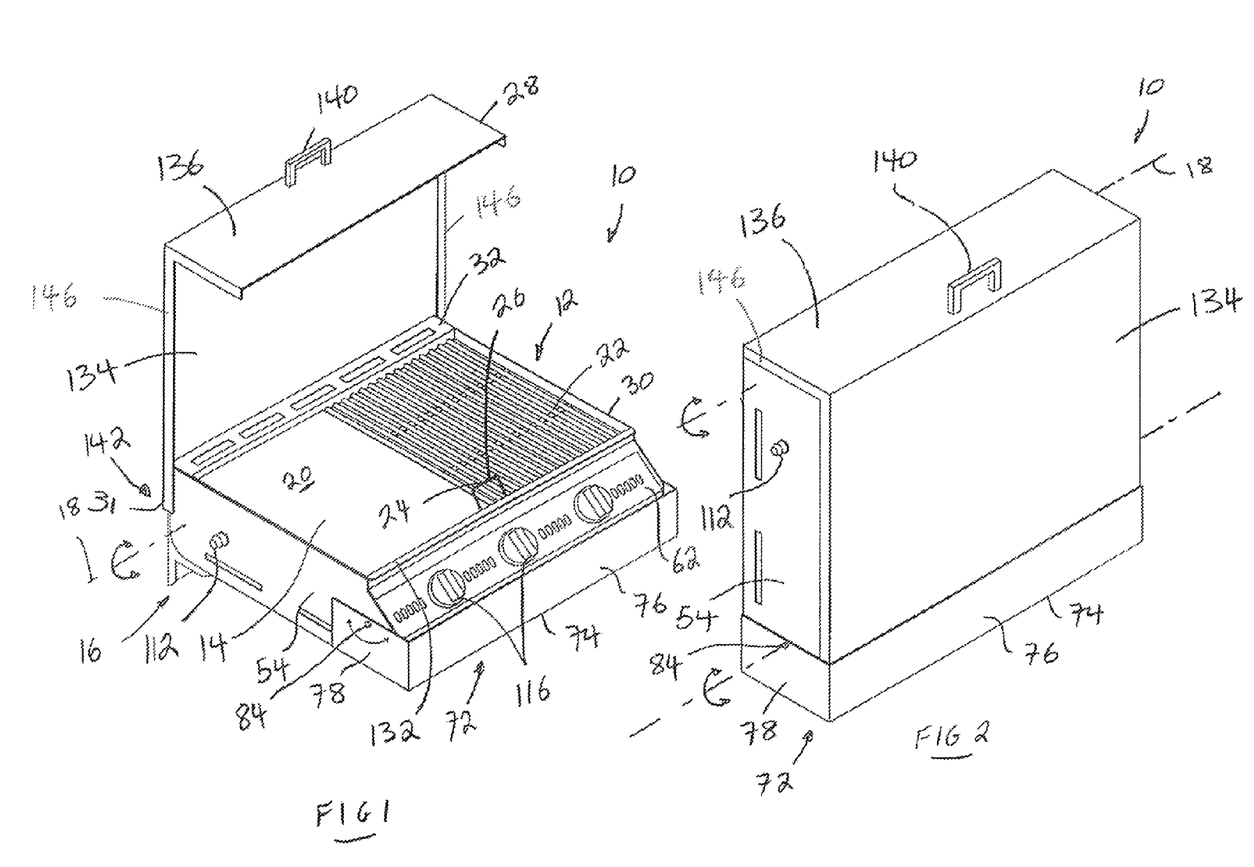
FIG. 1 shows a schematic three-dimensional view of one embodiment of a cooker, in accordance with the invention, in an operative position.
FIG. 2 shows a schematic three-dimensional view from above from one side of the cooker in FIG. 1, in a stowed position.

Broadly, the barbecue 10 includes a cooking assembly, generally indicated by reference numeral 12, that has a cooking member 14, and a hinging arrangement 16 to mount the cooking assembly 12 onto a support (not shown), so that the cooking assembly 12 is pivotal about a hinge axis 18 relative to the support between an operative position, as shown in FIG. 1, and a stowed position, as shown in FIG. 2. The support, for example, can be a brick wall, or any other structure that is able safely to support the weight of the barbecue 10.

Figures 7, 8:
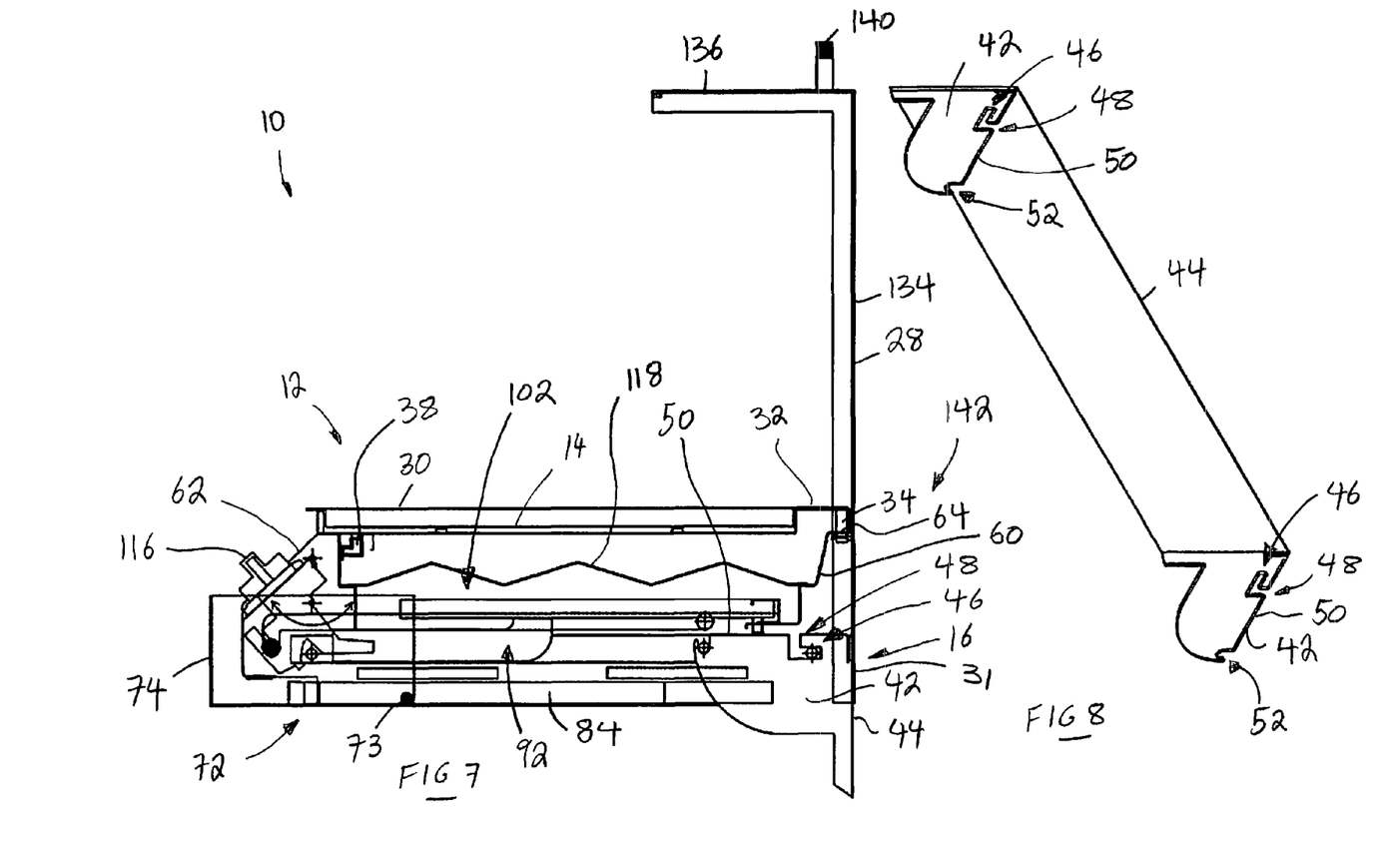
FIG. 7 shows a schematic view of an internal volume of the cooker in the operative condition.
FIG. 8 shows a mounting bracket that forms part of a hinging arrangement of the cooker.

The hinging arrangement 16 includes a pair of spaced hinge brackets 42 extending generally orthogonally to sides of a mounting plate 44. The hinge brackets 42 and the mounting plate 44 are shown in FIG. 8. Each hinge bracket 42 defines a slot 46 that extends along a line generally orthogonal to the mounting plate 44. A passage 48 is open at a forward end of the slot 46 and an upper edge 50 of the hinge bracket 42. Each hinge bracket 42 also defines a detent recess 52 opening at the upper edge 50 and spaced forwardly of the passage 48.

Figure 5:
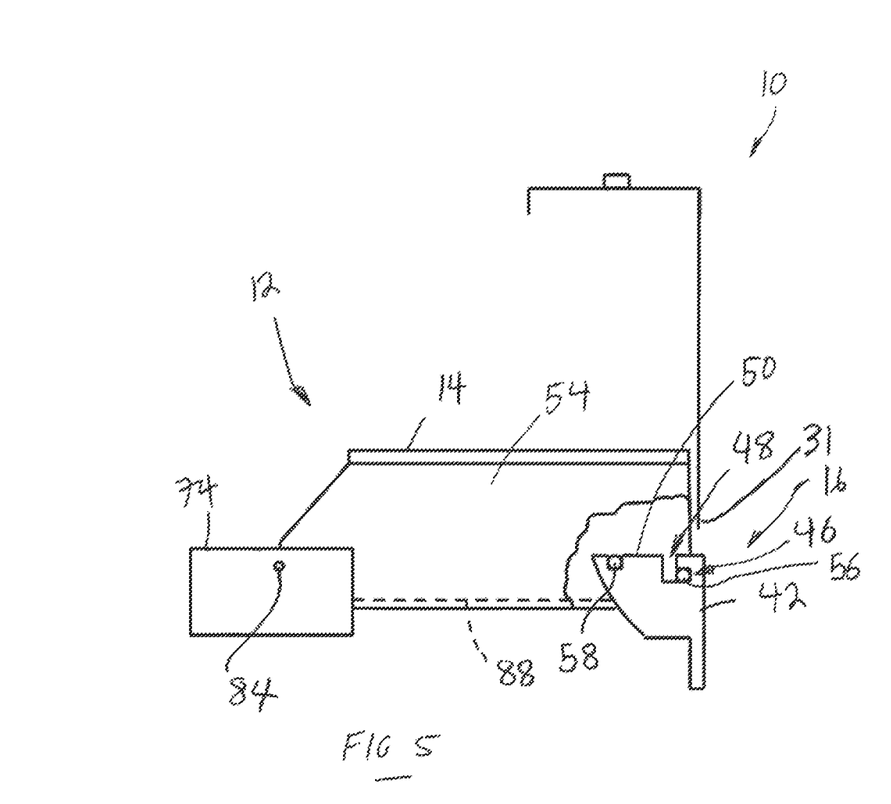
FIG. 5 shows a schematic partly cut-away side elevation view of the cooker in the operative condition.
Figure 6:
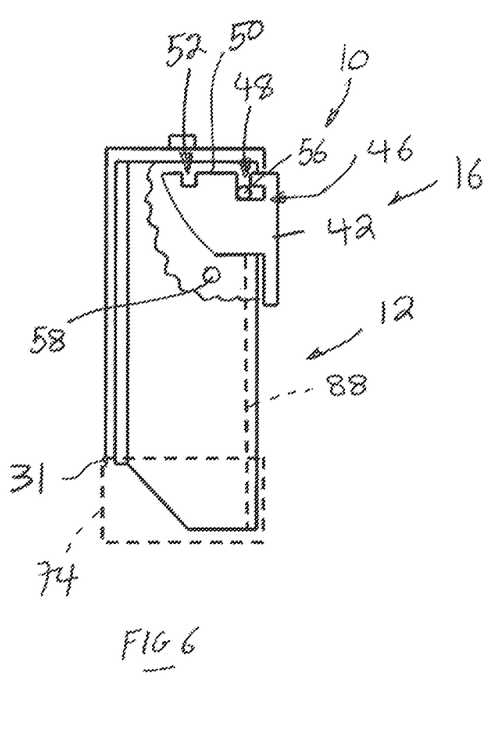
FIG. 6 shows a schematic partly cut-away side elevation view of the cooker in the stowed condition.

The cooking assembly 14 includes a pair of sidewalls 54. A hinge pin or rod 56 is mounted between the sidewalls 54 and can be received in the slot 46 and the passage 48. Thus, with the rod 56 in the slot 46, the sidewalls and thus the cooking assembly 14 can be moved to and fro with respect to the mounting plate 44. A detent pin or rod 58 is mounted between the sidewalls 54. The rod 58 can be received in the detent recess 52 when the rod 56 is positioned towards a rear end of the slot 46. From that position, the cooking assembly 14 can be tilted upwardly so that the rod 58 clears the recess 52. The cooking assembly can then be moved forwardly, away from the mounting plate 44, so that the rod 58 can clear the hinge brackets 42, allowing the cooking assembly 12 to pivot downwardly into the position shown in FIGS. 2 and 3 and illustrated in FIGS. 5 and 6.

A rear panel 60 and a front panel 62 are arranged between the sidewalls 54.

Figure 9:
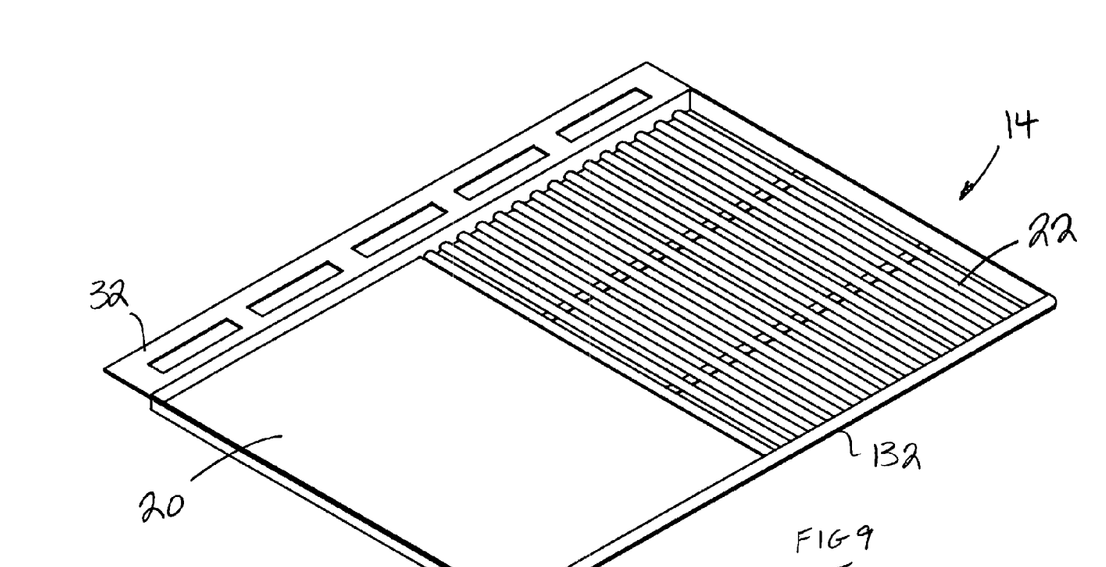
FIG. 9 shows a schematic three-dimensional view from above of a cooker member forming part of the cooker.
Figure 10:
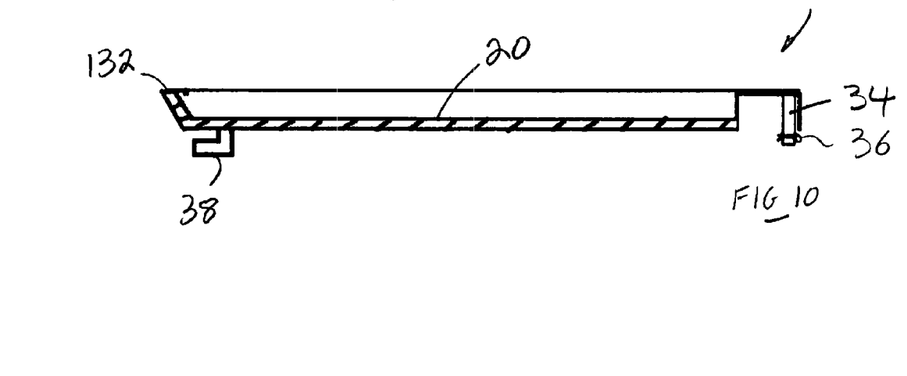
FIG. 10 shows a schematic side elevation section view of the cooking member in FIG. 9.
Figures 13, 14:
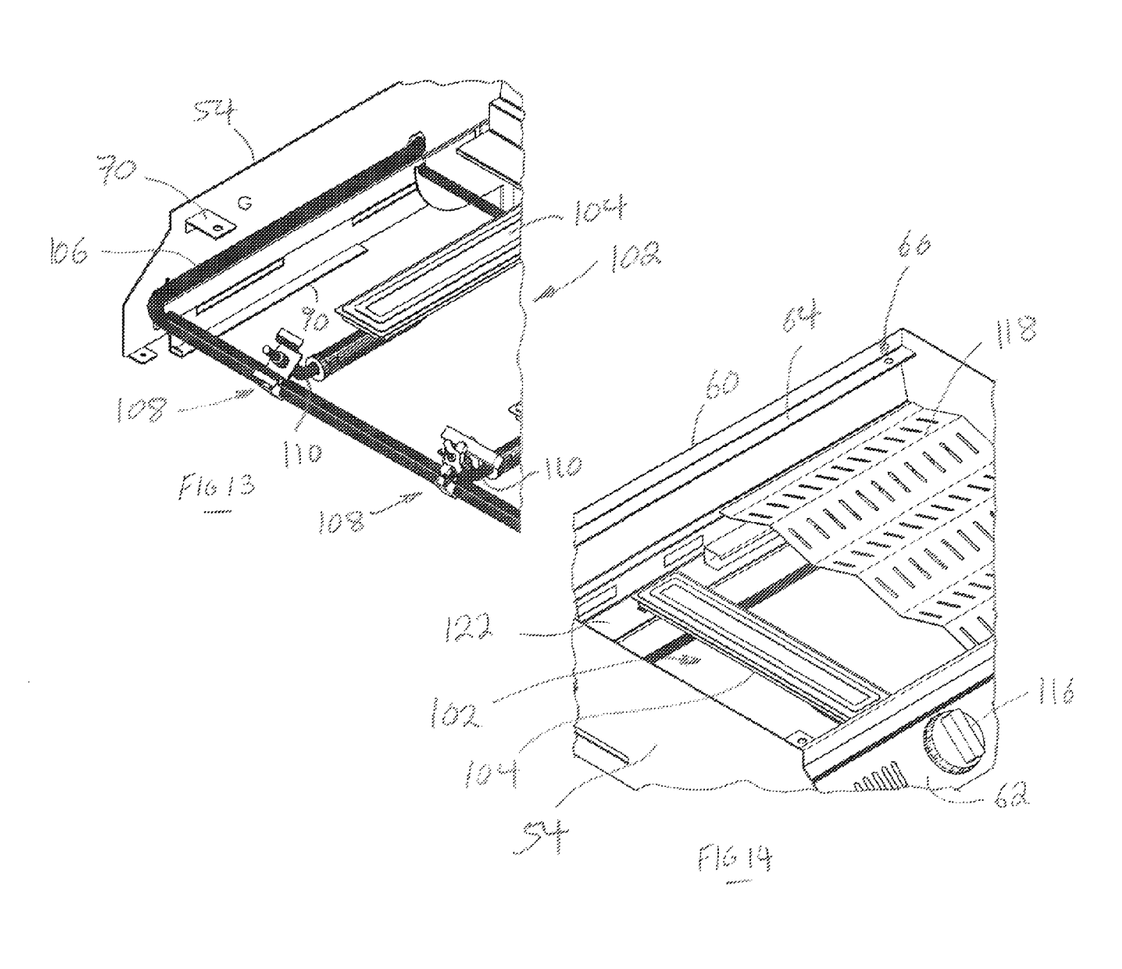
FIG. 13 shows part of the cooker, illustrating a gas supply and burner arrangement thereof.
FIG. 14 shows part of the cooker, illustrating further a burner arrangement thereof.

The cooking member 14 incorporates a griddle 20 and a grill 22 as shown in FIGS. 9 and 10. The cooking member 14 includes a rectangular frame 30 with both the griddle 20 and the grill 22 arranged within the frame 30. A flange 32 extends from a rear portion of the frame 30. A lip 64 extends from the rear panel 60. The lip 64 defines a pair of openings 66 (FIG. 14). Projections in the form of a pair of lugs 34 extend from the flange 32 to be received in respective openings 66 in the lip 64. A locking arrangement, such as a split pin 36, is received through each lug 34 to ensure that the flange 32 remains fastened to the lip 64.

A pair of L-shaped lugs 38 projects from the frame 30 near a front edge of the cooking member 14. Free legs of the L-shaped lugs 38 are received within associated holes defined by a pair of corresponding tabs 70 (FIGS. 11 to 13) extending oppositely and inwardly from respective sidewalls 54. It will be appreciated that in order to secure the cooking member 14, the cooking member 14 must first be tilted and then lowered into position to allow the L-shaped lugs 38 to be received through the holes defined by the tabs 70. This serves further to secure the cooking member 14 in position.

A handle 24 (see FIG. 1) is positioned on a front edge of the cooking member 14. The handle 24 is biased towards an operative position in which a gripping member 26 of the handle projects from the cooking member 14. The handle 24 can be biased with biasing springs, or any other appropriate biasing means that urges the handle 24 into its operative position. When a lid 28 is placed over the cooking member 14 the handle 24 is pressed towards the cooking member 14. Subsequently, when the lid 28 is removed from the cooking assembly 12, the handle 24 moves into its operative position to allow a user to grasp the gripping member 26. The handle 24 is used to pivot the cooking assembly 12 between the operative and stowed positions.

It will be appreciated that the handle 24 could be positioned elsewhere. There could also be two handles. For example, there could be a handle on each side of the cooking assembly 12.

The cooker 10 includes a drip tray arrangement 72. The arrangement 72 includes an elongated front drip tray 74 that is attached to the cooking assembly 12 and configured and positioned to catch drippings from a front edge of the cooking member 72. The front drip tray 46 includes a front wall 76, lateral sidewalls 78 and a floor 80. A rear wall 82 of the front drip tray 74 is of low profile so that a front end portion of the cooking assembly 12 can project into an interior space of the front drip tray 74. The front drip tray 74 is attached in a manner that allows the front drip tray 74 to pivot so that it remains in a suitable orientation to receive drippings while the cooking assembly 12 is moved between the operative and stowed positions. To that end, a counterweight 73 can be arranged on or in the drip tray 74 to facilitate retention of the tray 74 in the operative orientation while the cooking assembly 12 is moved between the operative and stowed positions.

Figure 4:
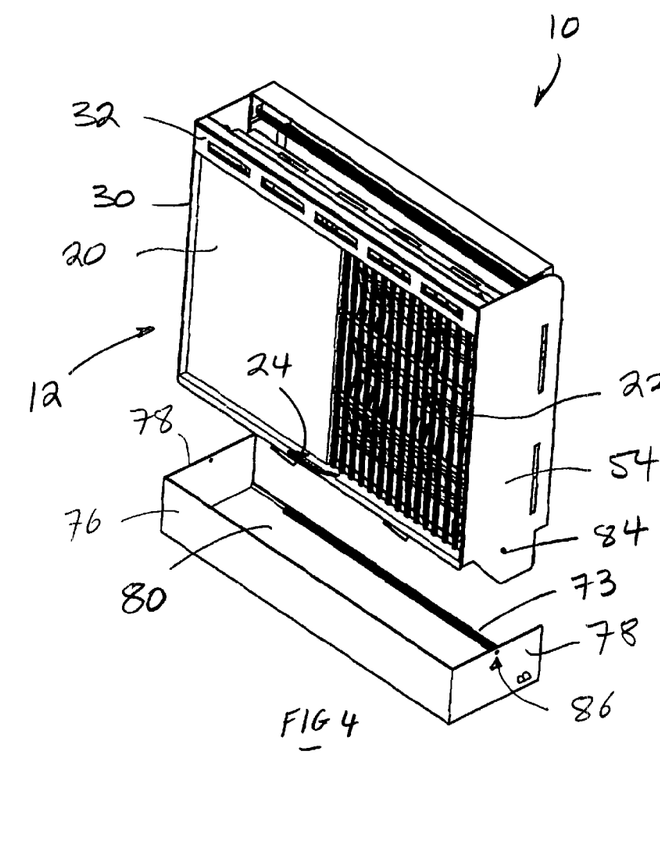
FIG. 4 shows a schematic three dimensional partly exploded view of the cooker in the stowed condition.

Pins 84 extend outwardly from respective sidewalls 54. The pins 84 extend through respective openings 86 (FIG. 4) defined in the sidewalls 78 of the front drip tray 74 so that the tray 74 can pivot with respect to the sidewalls 54 and thus the cooking member 14.

Figures 11, 12:
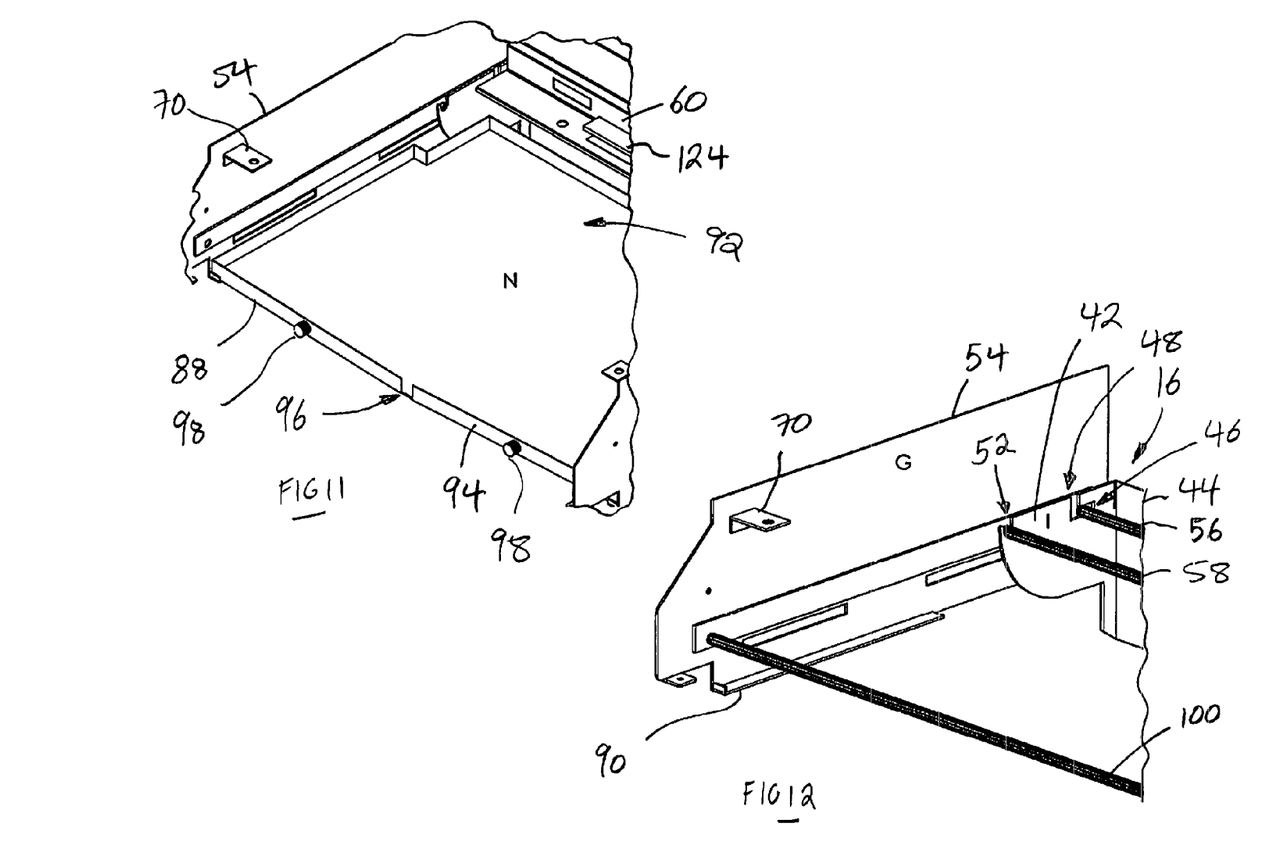
FIG. 11 shows a partly disassembled, three-dimensional view of the cooker, illustrating part of a bottom drip tray.
FIG. 12 shows part of the cooker, illustrating part of a hinging arrangement of the cooker.

The drip tray arrangement 72 also includes a bottom drip tray 88 that is shown in detail in FIG. 11 together with the manner in which the drip tray 88 is mounted between the sidewalls 54 of the cooking assembly 12. Each sidewall 54 has a retaining formation 90 that extends into an internal volume 92 of the cooking assembly 12 from an operatively lower edge of the sidewall 54. The retaining formations 90 are configured to retain the drip tray 88 in a position beneath the burners (described below) when the assembly 12 is in both the operative and stowed positions. The drip tray 88 has a peripheral lip 94. A gap 96 is defined in a front part of the lip 94. The gap 96 allows drippings and other cooking waste to pass from the drip tray 88 into the drip tray 74 when the cooking assembly 12 is tilted downwardly to be moved into its stowed position. A pair of handles 98 extends from the front part of the lip 94 to facilitate removal and replacement of the drip tray 88.

A structural bar 100 is fastened to, and extends between the sidewalls 54 at or near a front of the sidewalls 24.

FIG. 13 shows a heat source arrangement 102 within the volume 92. The arrangement 102 includes a number of gas burners 104, one of which is shown. A gas supply line 106 enters the volume 84 through one of the sidewalls 54, extends along the sidewall 54 towards a front of the cooking assembly 12 and spans the volume 92 between the sidewalls 54. Gas regulator and control devices 108 are engaged with the line 106 to control the supply of gas to the burners 104 via feed lines 110.

The gas supply line 106 is connected to a gas supply connector 112 (FIGS. 1 and 2), that extends through one of the sidewalls 54 and is configured for attachment to a conventional gas supply.

Figure 15:
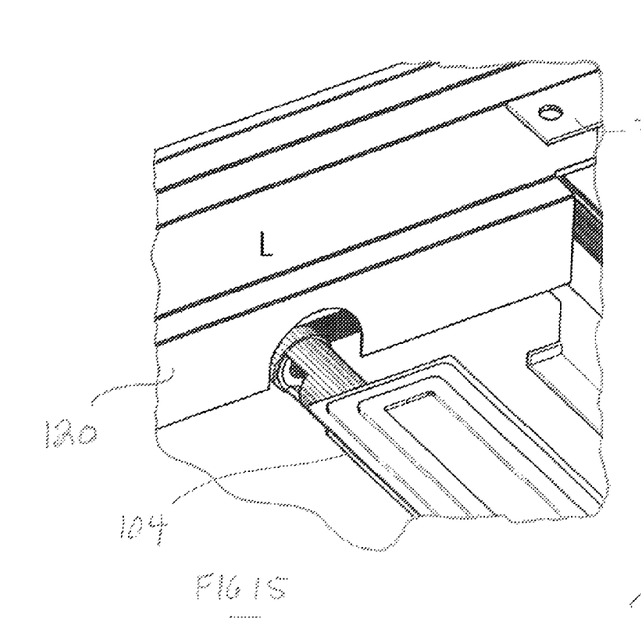
FIG. 15 shows part of the cooker, also illustrating a burner arrangement thereof.
Figure 16:
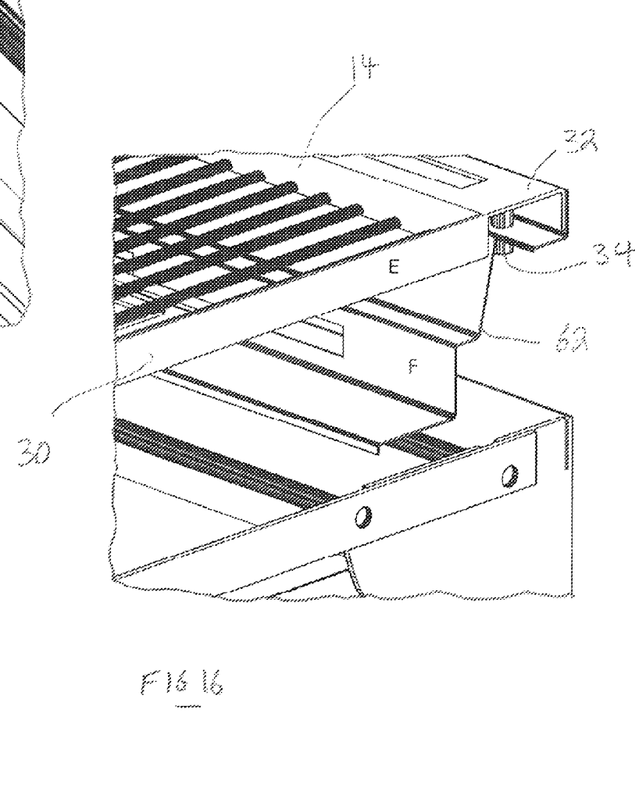
FIG. 16 shows part of the cooker, illustrating a manner in which a cooking member is secured or located in position.
Figure 17:
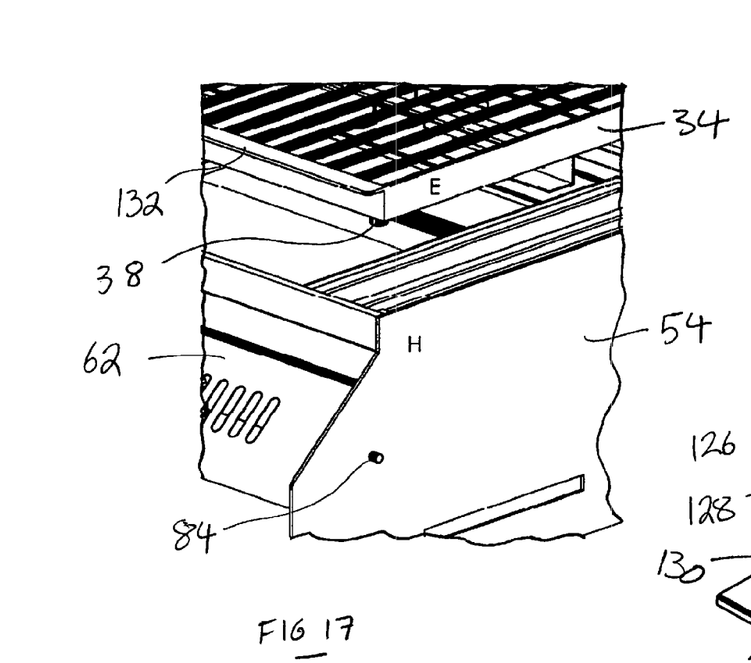
FIG. 17 shows part of the cooker, illustrating part of the cooking member.

Further detail of the burners 104, the supply line 106 and the devices 108 is shown in FIGS. 14 and 15.

As can be seen in FIGS. 1 and 14, control buttons 116 are connected to the devices 108 through the panel 62. A shield or diffuser 118 (FIG. 14) can be positioned over the burners 104.

In FIG. 15, there is shown an internal cover member 120 that is fastened to the front panel 62 and configured to cover or shield the devices 108.

Figure 18:
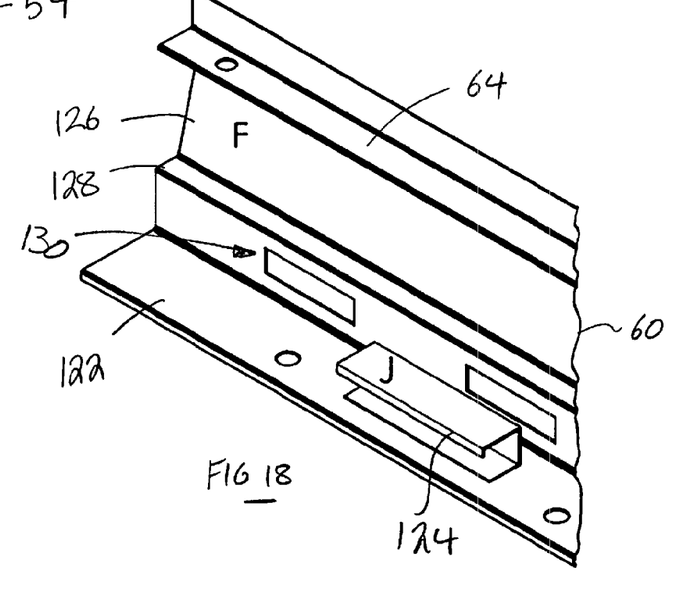
FIG. 18 shows a rear panel of the cooker supporting the burner arrangement and securing the cooking member in position.
Figures 19, 20:
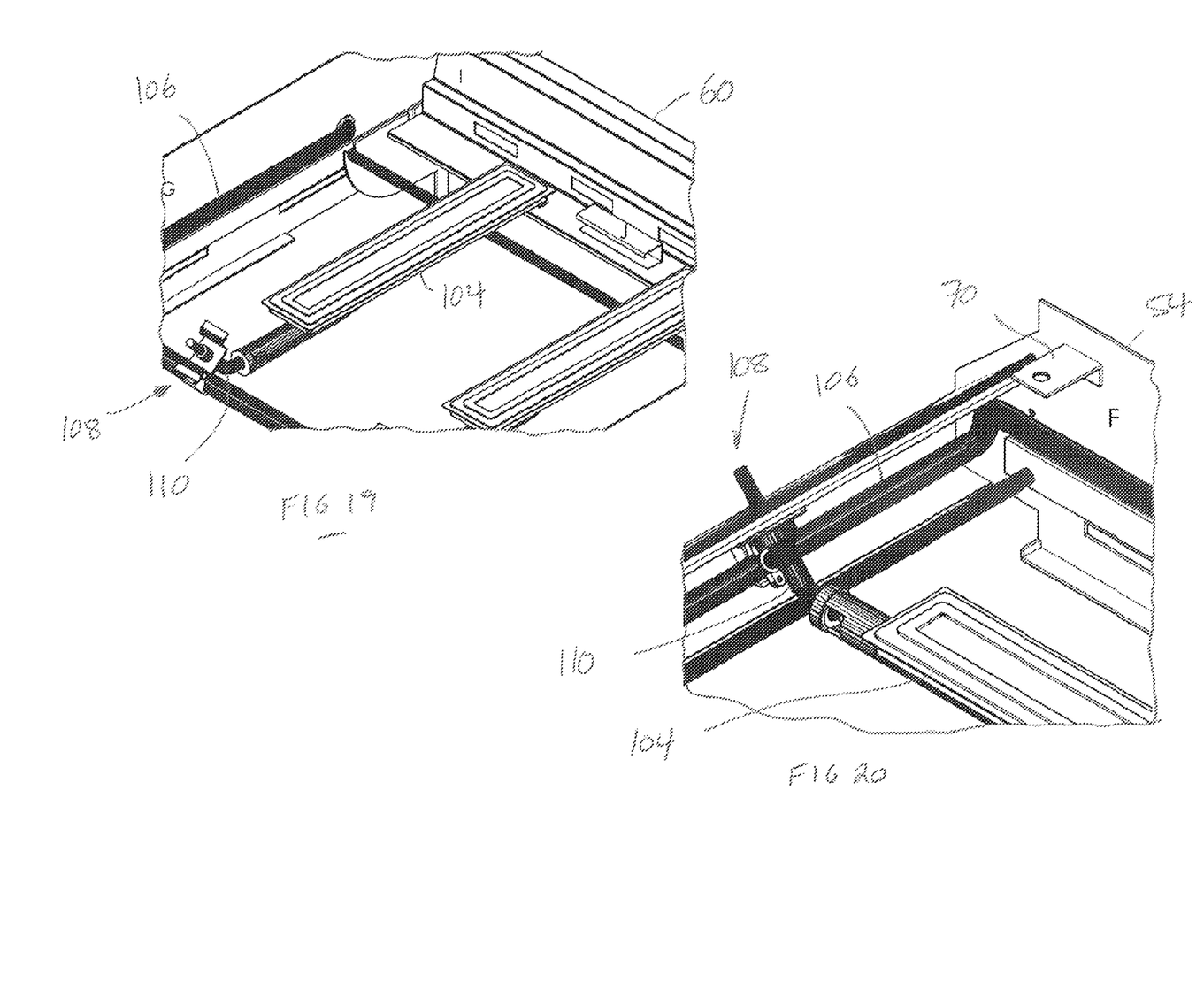
FIG. 19 shows part of the cooker illustrating a manner in which the burners are supported.
FIG. 20 shows part of the cooker illustrating a gas supply to one of the burners.

FIG. 18 shows the rear panel 60 that is used to secure the cooking member 14 and to support the burners 104.

The rear panel 60 is secured between the sidewalls 54 to span the volume 92. The rear panel 60 includes a lower ledge 122 for supporting ends of the burners 104. A gas guide formation or structure 124 is positioned on the ledge 122 for guiding gas from unlit burners to lit burners so that the unlit burners can self-ignite. An intermediate portion 126 is interposed between a shoulder portion 128 and the ledge 122. The intermediate portion 126 is stepped with ventilation openings 130.

As can be seen in for example FIGS. 9 and 10, a lip 132 extends from a front portion of the frame 30. The lip 132 helps to ensure that drippings do not fall on to the front panel 62, thereby passing directly into the drip tray 74.

The lid 28 is dual purpose. The lid 28 is L-shaped and includes a major lid wall 134 from which a minor lid wall 136 projects. The lid 28 also includes a handle 140 that is provided on the minor lid wall 136.

Figure 3:
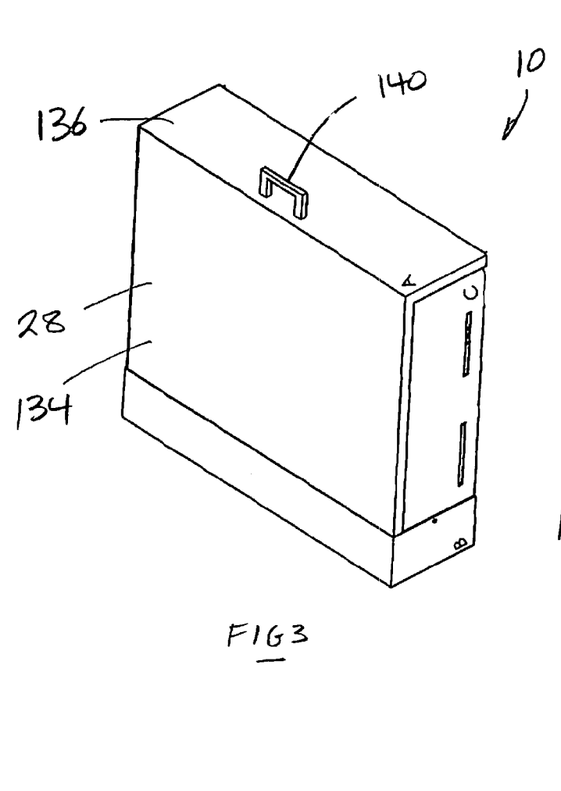
FIG. 3 shows a schematic three dimensional view from above from another side of the cooker in the stowed condition.

One purpose of the lid 28 is for closing-off associated parts of the cooking assembly 12, such as a rear side 142 and the griddle 20 when the cooking assembly 12 is in its stowed position, as shown in FIG. 2 and FIG. 3. Another purpose of the lid 28 is to form a splash back for the barbecue 10 when the cooking assembly 12 is in its operative position, as shown in FIG. 1. The cooking assembly 12 and the hinging arrangement 16 are configured to define a gap between the rear side of the cooking assembly 12 and a support. This allows an edge portion 31 of the lid 28 to be received in the gap and supported by the hinging arrangement 16. This is illustrated, for example, in FIG. 8.

The lid 28 can include seals to seal off the parts that it covers, to inhibit vermin from entering the cooking assembly. Instead, or in addition, the lid 28, the front drip tray 74, the bottom drip tray 88 and the cooking assembly 12 are configured so that when the cooking assembly 12 is in the stowed condition as shown in FIG. 2, the ingress of vermin is inhibited.

In use, the lid 28 can be lifted from the splash back position, prior to the cooking assembly 12 being pivoted into its stowed condition. The lid 28 is then manipulated into the position shown in FIGS. 2, 3 and 6. In that position, the wall 76 of the drip tray 74 can overlie an operatively lower edge portion 144 of the lid 23. Furthermore, the lid 28 has a peripheral lip 146 that can overlie the sidewalls 54. The seals or seal can be located on an inner surface of the lip 146 to enhance sealing of the lid 28 with respect to the cooking assembly 12.

When the cooker 10 is in its stowed position, material such as drippings and debris from the griddle 20 and the bottom drip tray 88 can drop into the front drip tray 74.

The front drip tray 74 can be detached from the cooking assembly 12 so that a user can remove, empty and clean the front drip tray 74.

Usefully, the cooker 10 includes a hinging arrangement with which the cooker is mountable to a support, so that the cooker can be stored in a stowed position in which its footprint is smaller than when it is in its operative position. This is particularly useful in outdoor living areas such as balconies, patios, and the like, where floor area is at a premium.

The cooker includes a front drip tray 74 that catches drippings from the cooking member and the bottom drip tray 88 when the cooker is in its stowed position. Still further, the front drip tray 74 automatically positions itself relative to the cooking assembly 12 when the cooking assembly 12 is displaced between the operative and stowed positions, which is useful to eliminate user dependent positioning of the front drip tray 74.

It is to be appreciated that the heat source arrangement 102 can be an electrically powered heat source. For example, the burners could be replaced by electrical heating elements and the gas supply lines with electrical power supply lines.

The above description of the drawings has been given only by way of illustrative example of the invention and that all such modifications and variations thereto, as would be apparent to persons skilled in the art, are deemed to fall within the broad scope and ambit of the invention as is herein set forth.

It is to be understood that the terminology employed above is for the purpose of description and should not be regarded as limiting. The described embodiments are intended to be illustrative of the invention, without limiting the scope thereof. The invention is capable of being practised with various modifications and additions as will readily occur to those skilled in the art.

Various substantially and specifically practical and useful exemplary embodiments of the claimed subject matter, are described herein, textually and/or graphically, including the best mode, if any, known to the inventors for carrying out the claimed subject matter. Variations (e.g., modifications and/or enhancements) of one or more embodiments described herein might become apparent to those of ordinary skill in the art upon reading this application. The inventors expect skilled artisans to employ such variations as appropriate, and the inventors intend for the claimed subject matter to be practiced other than as specifically described herein. Accordingly, as permitted by law, the claimed subject matter includes and covers all equivalents of the claimed subject matter and all improvements to the claimed subject matter. Moreover, every combination of the above described elements, activities, and all possible variations thereof are encompassed by the claimed subject matter unless otherwise clearly indicated herein, clearly and specifically disclaimed, or otherwise clearly contradicted by context.

The use of any and all examples, or exemplary language (e.g., "such as") provided herein, is intended merely to better illuminate one or more embodiments and does not pose a limitation on the scope of any claimed subject matter unless otherwise stated. No language in the specification should be construed as indicating any non-claimed subject matter as essential to the practice of the claimed subject matter.

Thus, regardless of the content of any portion (e.g., title, field, background, summary, description, abstract, drawing figure, etc.) of this application, unless clearly specified to the contrary, such as via explicit definition, assertion, or argument, or clearly contradicted by context, with respect to any claim, whether of this application and/or any claim of any application claiming priority hereto, and whether originally presented or otherwise:

(a) there is no requirement for the inclusion of any particular described or illustrated characteristic, function, activity, or element, any particular sequence of activities, or any particular interrelationship of elements;

(b) no characteristic, function, activity, or element is "essential";

(c) any elements can be integrated, segregated, and/or duplicated;

(d) any activity can be repeated, any activity can be performed by multiple entities, and/or any activity can be performed in multiple jurisdictions; and (e) any activity or element can be specifically excluded, the sequence of activities can vary, and/or the interrelationship of elements can vary.

The use of the terms "a", "an", "said", "the", and/or similar referents in the context of describing various embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

Every portion (e.g., title, field, background, summary, description, abstract, drawing figure, etc.) of this application, other than the claims themselves, is to be regarded as illustrative in nature, and not as restrictive, and the scope of subject matter protected by any patent that issues based on this application is defined only by the claims of that patent.

What is claimed is:

1. A cooker, which comprises:
    a cooking assembly having a cooking member;
    a hinging arrangement to mount the cooking assembly onto a support so that the cooking assembly can be displaced relative to the support between an operative position in which the cooking member is in a substantially horizontal orientation and a stowed position in which the cooking assembly is displaced towards the support; and
    a front drip tray having a pin assembly to pivotally mount the front drip tray on the cooking assembly and wherein the front drip tray is configured to pivot relative to the cooking assembly while the cooking assembly is pivoted between the operative and stowed positions and to catch cooking waste, such as drippings, from the cooking member as the cooking assembly is pivoted into the stowed position.

2. A cooker as claimed in claim 1, in which the hinging arrangement is configured to engage and support the cooking assembly, in a releasable manner, in the operative position and, upon manipulation of the cooking assembly, to permit the cooking assembly to pivot into the stowed position.

3. A cooker as claimed in claim 2, in which the hinging arrangement includes a mounting plate fastenable to the support and two spaced hinge brackets extending generally orthogonally from the mounting plate, each hinge bracket defining a slot that extends generally orthogonally with respect to the mounting plate and a passage that extends from a front end of the slot and that opens at an upper edge of the hinge bracket.

4. A cooker as claimed in claim 3, which includes a hinge rod that is mounted on the cooking assembly to extend generally parallel to the mounting plate, the hinge rod being receivable in the passage and the slot and being able to slide in the slot towards and away from the mounting plate.

5. A cooker as claimed in claim 4, in which each hinge bracket also includes a detent recess defined in the upper edge, a detent rod being mounted on the cooking assembly and generally parallel to the mounting plate, in front of the hinge rod, to support the cooker assembly in the operative position when the hinge rod is received in the slot and the detent rod is received in the detent recess.

6. A cooker as claimed in claim 1 which includes a bottom drip tray that extends across an operative bottom side of the cooking assembly, opposite the cooking member, to catch drippings from the cooking member, while the cooking assembly is in operation, the front drip tray and the bottom drip tray being positioned relative to each other to permit material from the bottom drip tray to move, under gravity, into the front drip tray, at least when the cooking assembly is in the stowed condition.

7. A cooker as claimed in claim 1, in which the cooking member includes a front edge formation to direct cooking waste from the cooking member into the front drip tray past a face of the cooking assembly when the cooking assembly is displaced from its operative to its stowed position.

8. A cooker as claimed in claim 1, in which the cooking assembly defines an interior space and includes a heat source arrangement within the interior space, the heat source arrangement including any of a plurality of gas burners and electrical heating elements.

9. A cooker as claimed in claim 8, in which the cooking member is detachably mounted or mountable over the heat source arrangement.

10. A cooker as claimed in claim 9, in which the cooking assembly and cooking member include a plurality of complementary retaining formations to locate, secure and retain the cooking member in position while the cooking assembly is displaced between the operative position and the stowed position.

11. A cooker as claimed in claim 10, in which a handle is arranged on the cooking member to facilitate displacement of the cooking assembly between the operative and stowed positions.

12. A cooker as claimed in claim 1, which includes a lid for closing-off at least part of the cooking assembly when the cooking assembly is in its stowed position, and for mounting onto the cooking assembly when the cooking assembly is in its operative position in a manner that forms a splash back for the cooker.

13. A cooker as claimed in claim 1, which includes a lid for closing off an internal volume of the cooking assembly to inhibit the ingress of vermin.

* * * * *